United States Patent
Farchi et al.

(10) Patent No.: US 8,370,816 B2
(45) Date of Patent: Feb. 5, 2013

(54) DEVICE, METHOD AND COMPUTER PROGRAM PRODUCT FOR EVALUATING A DEBUGGER SCRIPT

(75) Inventors: Eitan Daniel Farchi, Pardes Hana (IL); Shachar Fienblit, Ein Ayala (IL); Shay Gammer, Haifa (IL); Sheli Rahav, Haifa (IL); Orna Raz-Pelleg, Haifa (IL); Dalit Tzafrir, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1679 days.

(21) Appl. No.: 11/743,164

(22) Filed: May 2, 2007

(65) Prior Publication Data

US 2008/0276226 A1    Nov. 6, 2008

(51) Int. Cl.
  *G06F 9/44* (2006.01)
(52) U.S. Cl. ......... 717/129; 717/125; 717/128; 717/130
(58) Field of Classification Search ................ 717/129
  See application file for complete search history.

(56) References Cited

U.S. PATENT DOCUMENTS

| | | | |
|---|---|---|---|
| 6,990,657 B2 | 1/2006 | Hunter et al. | |
| 6,993,710 B1 | 1/2006 | Coad et al. | |
| 7,096,458 B2 | 8/2006 | Bates et al. | |
| 7,257,805 B2 * | 8/2007 | Gritter | 717/129 |
| 7,607,123 B2 * | 10/2009 | Chavan | 717/129 |
| 2006/0064676 A1 | 3/2006 | Chevan | |
| 2006/0064677 A1 | 3/2006 | Bickson et al. | |
| 2006/0200482 A1 | 9/2006 | Tan | |

OTHER PUBLICATIONS

A New Breakpoint Implementation Scheme for Debugging Globally Optimized Code (Source:http://citeseer.ist.psu.edu/cache/papers/cs/16454/http:zSzzSzwww.crhc.uiuc.eduzSzIMPACTzSzftpzSzreportzSzimpact-98-06.break.pdf/wu98new.pdf), Jul. 1998.

M. Copperman, "Debugging optimized code without being misled", ACM Transactions on Programming Languages and Systems, v 16, n 3, May 1994, 387-427 (Source:http://citeseer.ist.psu.edu/cache/papers/cs/14938/ftp:zSzzSzftp.cse.ucsc.eduzSzpubzSztrzSzucsc-cr1-93-21.pdf/copperman93debugging.pdf).

* cited by examiner

*Primary Examiner* — Isaac Tecklu
*Assistant Examiner* — John Mason (57) ABSTRACT

A method for evaluating a debugger script, the method includes: (i) receiving a debugger script that includes a first debugger breakpoint that is associated with a certain program line number; and determining a validity of the first debugger breakpoint in response to a comparison between expected content associated with the first debugger breakpoint and between an actual content of at least a portion of a certain program line group that comprises a certain program line identified by the certain program line number.

5 Claims, 6 Drawing Sheets

DEVICE, METHOD AND COMPUTER PROGRAM PRODUCT FOR EVALUATING A DEBUGGER SCRIPT

FIELD OF THE INVENTION

The present invention relates to a method, a device and a computer program product for evaluating a debugger script.

BACKGROUND OF THE INVENTION

An important aspect of the design and development of a computer program is debugging which is intended to locate and identify errors in a computer program under development. Typically, a programmer uses another computer program commonly known as a "debugger" to debug a program under development. A user may debug different computer programs or may repetitively debug the same computer program during multiple debugger sessions. The debugging is implemented by executing a debugger script.

Conventional debuggers typically support two primary operations to assist a computer programmer. A first operation supported by conventional debuggers is a step function which permits a computer programmer to process program lines (also referred to as instructions or statements), one at a time in a computer program and see the results of each instruction upon completion. A second operation supported by conventional debuggers is the breakpoint operation which permits a computer programmer to identify a breakpoint as a precise instruction (identified by a instruction line number) at which execution of a computer program can be (conditionally or unconditionally) halted. As a computer program is executed by a debugger, the program executes in a normal fashion until a breakpoint is reached, the program can stop execution and the debugger can display the results of the computer program to the programmer for analysis.

The breakpoints are commonly directly tied to a specific line in the program. If the program is altered by an addition of a new program line and additionally or alternatively, by a removal of a program line, the definition of the breakpoint can be erroneous.

Accordingly, after the program is altered the programmer has to manually check that the breakpoint definitions are still valid. This manual stage is time consuming and also prevents the debugger from being incorporated into periodical (automatic) software tests, including software regression tests.

There is a need to provide efficient debugger script evaluation tools.

SUMMARY OF THE PRESENT INVENTION

A method for evaluating a debugger script, the method includes: (i) receiving a debugger script that includes a first debugger breakpoint that is associated with a certain program line number; and determining a validity of the first debugger breakpoint in response to a comparison between expected content associated with the first debugger breakpoint and between an actual content of at least a portion of a certain program line group that comprises a certain program line identified by the certain program line number.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

According to an embodiment of the invention the validity of a debugger script is evaluated before the debugger script is executed. A debugger script includes one or more debugger breakpoints. A debugger breakpoint can be associated with a certain program line number. This certain program line number identifies a certain program line. The certain program line belongs to a certain program line group that includes the certain program line. Conveniently, the certain program line group also includes one ore more program lines that are proximate to the certain program line. The debugger breakpoint can be associated with an expected content of the certain program lines group. The certain program line can be a source code line. The evaluation process includes comparing the expected content to the actual content of a program line group (or a portion of the program line group). Accordingly, if a mismatch is detected the debugger script can be updated, an alert can be generated or the debugger script execution can be prevented. According to an embodiment of the invention the program line group includes only the certain program line.

Conveniently, the evaluation process includes accessing a mapping data structure that maps debugger breakpoints to program lines numbers and expected program line group (or program line group portion) contents Conveniently, the debugger script evaluation process increases the reliability of the debugger script, and can facilitate an inclusion of the debugger script (as well as the debugger script evaluator) within periodically-executed test programs such as software regression programs.

Figure 1:
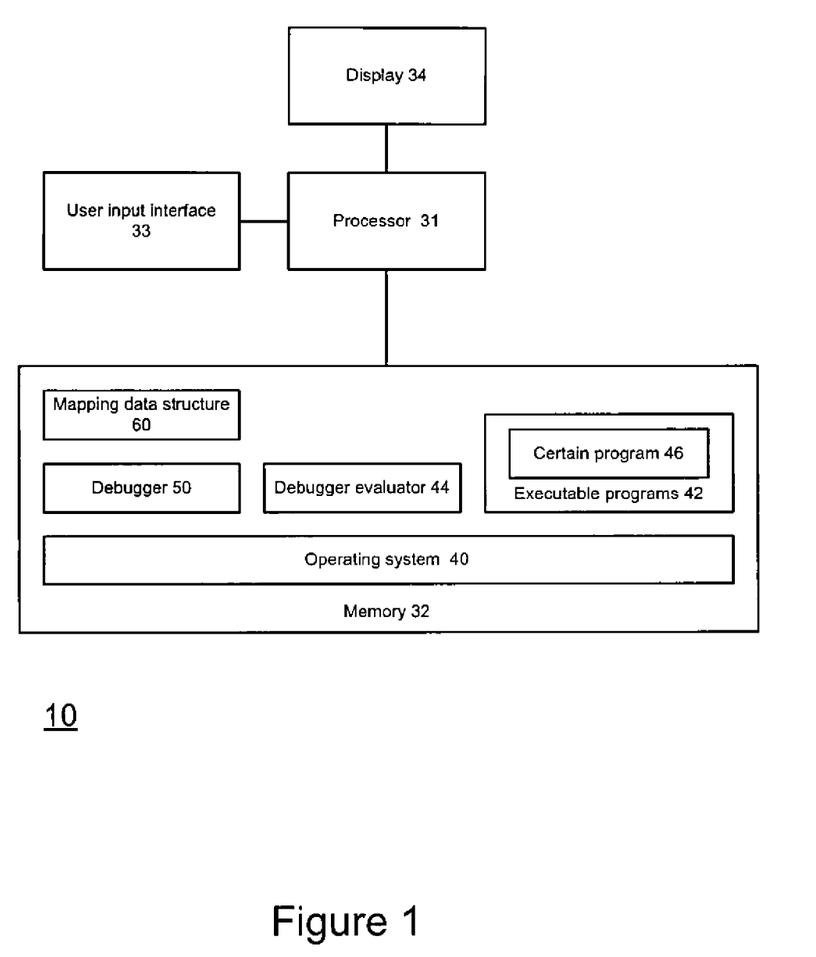
FIG. 1 illustrates a system having debugger script evaluation capabilities, according to an embodiment of the invention.

FIG. 1 illustrates device 10 having debugger script evaluation capabilities, according to an embodiment of the invention.

Device 10 may represent practically any type of computer, computer system or other programmable electronic device. Device 10 may be connected in a network or may be a stand-alone device in the alternative. According to an embodiment of the invention device 10 is a storage controller that can be connected to multiple storage units.

Device 10 includes processor 31 that is connected to memory unit 32, user input interface component 33 and display 34. Device 10 can be connected to other devices via wired and/or wireless links. It is noted that device 10 can be characterized by a centralized architecture but that it can also be characterized by a distributed architecture. Accordingly, the various components of device 10 can be located near each other, but this is not necessarily so.

User input interface component 33 can be a keyboard, a mouse, a joystick, a touchpad, a microphone, a gesture recognition device, or a combination thereof. It is noted that some of the mentioned above components such as user input interface component 33 and display 34 are optional, especially when device 10 should not be directly accessed by the user. For example, a host computer that is placed in a remote location does not necessarily include display 34.

According to a first embodiment of the invention, device 10 operates under the control of operating system 40, and executes various computer software applications, components, programs, objects, modules, etc., such as but not limited to executable programs 42, debugger software application 50 (also referred to as debugger script 50) and debugger script evaluator 44.

Conveniently, device 10 can be controlled by multiple operating systems that in turn are monitored by a hypervisor. For simplicity of explanation FIG. 1 illustrates a single operating system.

It is noted that debugger script evaluator 44 can be viewed as one of the executable programs 42 and can be integrated within debugger script 50. It is further noted that device 10 can also execute a calling stack.

For simplicity of explanation it is assumed that debugger script 50 is used to debug a certain program (such as 46) out of executable programs 42.

Debugger script 50 is capable of executing debugger scripts. It conveniently operates outside integrated development environments such as Eclipse.

Figure 2:
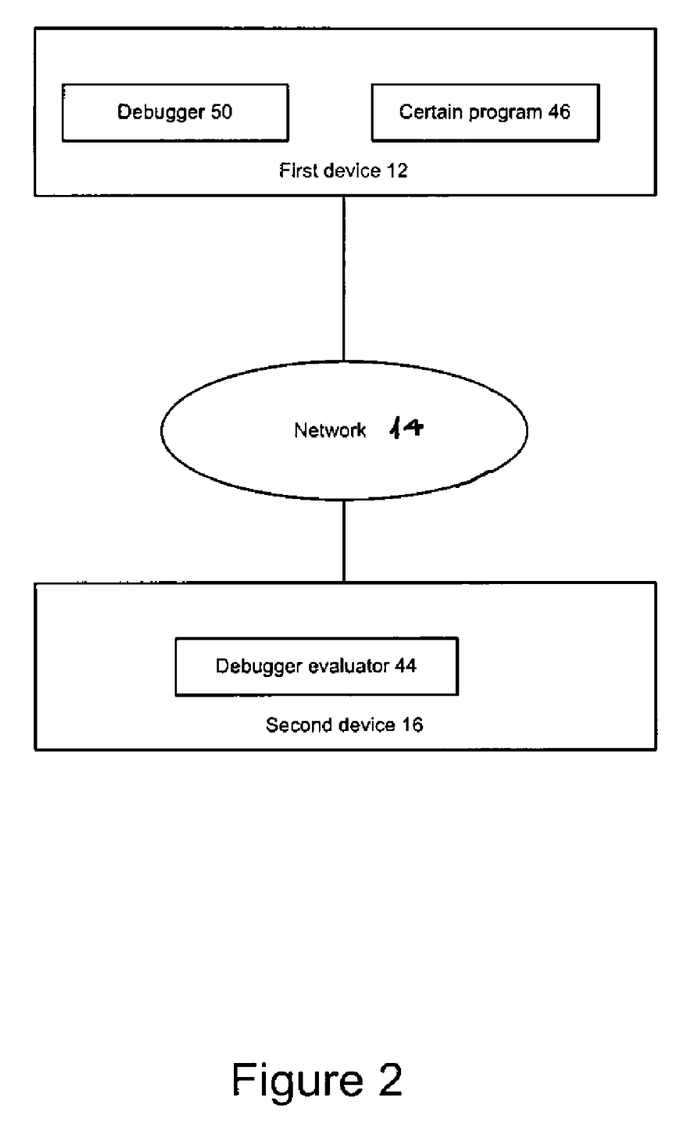
FIG. 2 illustrates a system having debugger script evaluation capabilities, according to an embodiment of the invention.

According to another embodiment of the invention debugger script 50 and debugger script evaluator 44 are stored at different devices, as illustrated in FIG. 2. Referring to FIG. 2, first device 12 can send, over network 14, debugger script 50 (as well as program 46) to second device 16. Second device 16 can then evaluate debugger software application 50 (also known as debugger script) by executing debugger script evaluator 44. The results of the evaluation can be sent, over network, 14, to first device 12. Second device 16 can also amend debugger script 50 and send the amended debugger script 50 to first device 12. It is noted that first device 12 and second device can include additional components such as display, user input interface, processor, memory and that they can store an operating system and executable programs.

Referring back to FIG. 1, debugger script evaluator 44 can be executed before an execution of debugger script 50. The execution of debugger script evaluator 44 can be triggered in response to a predefined debugger evaluation scheme (for example a periodical evaluation scheme), can be triggered in response to an occurrence of certain events (such as but not limited to an alteration of certain program 46), or can be triggered in view of a combination of both.

Certain program 46 includes many instruction lines and each line can be identified by a unique line number. Debugger script 50 may include multiple breakpoints. For simplicity of explanation the following example refers to a single debugger breakpoint that is referred to as first debugger breakpoint (not shown).

The first debugger breakpoint is defined at a certain point of time and is associated with a certain program line that is characterized by a certain line number. The content of that certain program line (or of a portion of that certain program lime) at this certain point in time is referred to an expected content. The expected content is also associated with first debugger breakpoint. It is noted that the first debugger breakpoint can be associated with an expected content of multiple programs lines that include the certain program line.

For example, assuming that: (i) the first debugger breakpoint is associated with the third line of certain program 46, (ii) when the first debugger breakpoint is defined the third line of certain program 46 includes the following content: "if (global==x) {", wherein "{" represent the term "then". Under these assumptions, the first debugger breakpoint should be associated with the third line and with "if (global==x) {". The association can be implemented by a mapping data structure 60 that maps debugger breakpoints to program lines numbers and program line contents.

If certain program 46 is updated in a manner that moves content "if (global==x) {" to a new program line (other that the third program line), the first debugger breakpoint is erroneous and debugger script evaluator 44 can send an alert to the user, prevent an execution of debugger script 50, locate the new program line, and the like.

It is noted that debugger script evaluator 44 can ignore annotations, blank spaces and the like. Debugger script evaluator 44 can apply various filters on the expected content and/or the actual content during the comparison between the actual and expected contents.

Conveniently, if a certain program line group includes a certain program line, N program lines that precede the certain program line and M program line that succeed the certain program line (N,M being positive integers) than the matching process can include comparing between the actual content (or at least a portion of the actual content) of these (M+N+1) program lines and the expected content (or at least a portion of the expected content) of these (M+N+1) program lines. In some cases a sufficient match can be found even if the actual and expected content of the certain program line do not match.

Figure 3:
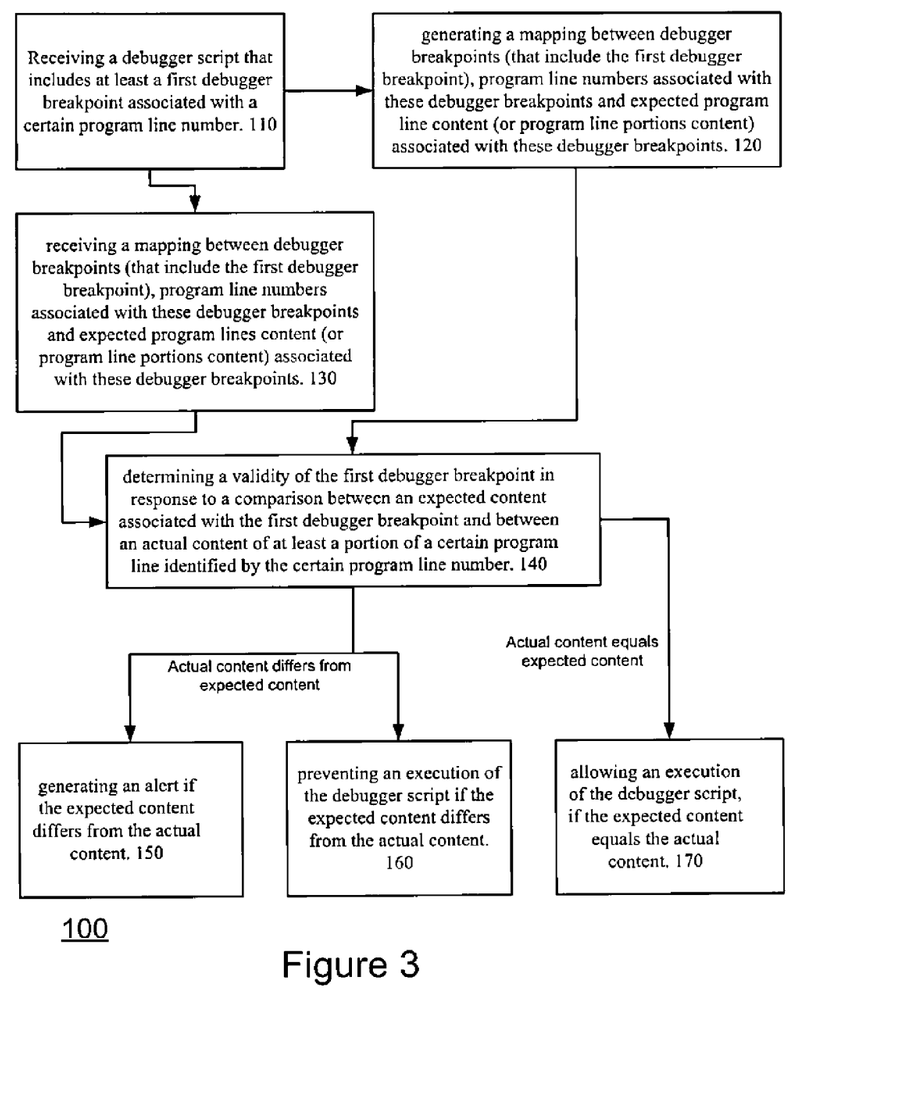
FIG. 3 is a flow chart of a method for evaluating a debugger script, according to an embodiment of the invention.

FIG. 3 is a flow chart of method 100 for evaluating a debugger script, according to an embodiment of the invention.

Method 100 starts by stage 110 of receiving a debugger script that includes at least a first debugger breakpoint associated with a certain program line number. This certain program line number identifies a certain program line. The certain program line belongs to a certain program line group. The certain program line group can include the certain program line and optionally one or more additional proximate program lines.

Stage 110 can be followed by stage 120 or stage 130.

Stage 120 includes generating a mapping between debugger breakpoints (that include the first debugger breakpoint), program line numbers associated with these debugger breakpoints and expected program line group content (or a portion of the certain program line group content) associated with these debugger breakpoints.

Stage 130 includes receiving a mapping between debugger breakpoints (that include the first debugger breakpoint), program line numbers associated with these debugger breakpoints and expected program line group content (or a portion of a program line group content) associated with these debugger breakpoints.

Stages 120 and 130 are followed by stage 140 of determining a validity of the first debugger breakpoint in response to a comparison between an expected content associated with the first debugger breakpoint and between an actual content of at least a portion of a certain program line group that includes the certain program line identified by the certain program line number.

Stage 140 can involve accessing a mapping data structure that maps debugger breakpoints to program lines numbers and expected program line group (or program line group portions) contents. This mapping data structure can be generated during stage 120 or received during stage 130.

Stage 140 can be followed by stage 150, stage 160 or stage 170.

Stage 150 includes generating an alert if the expected content differs from the actual content.

Stage 160 includes preventing an execution of the debugger script if the if the expected content differs from the actual content.

Stage 170 includes allowing an execution of the debugger script, if the expected content equals the actual content. Stage 170 may include generating a breakpoint validity indication.

Figure 4:
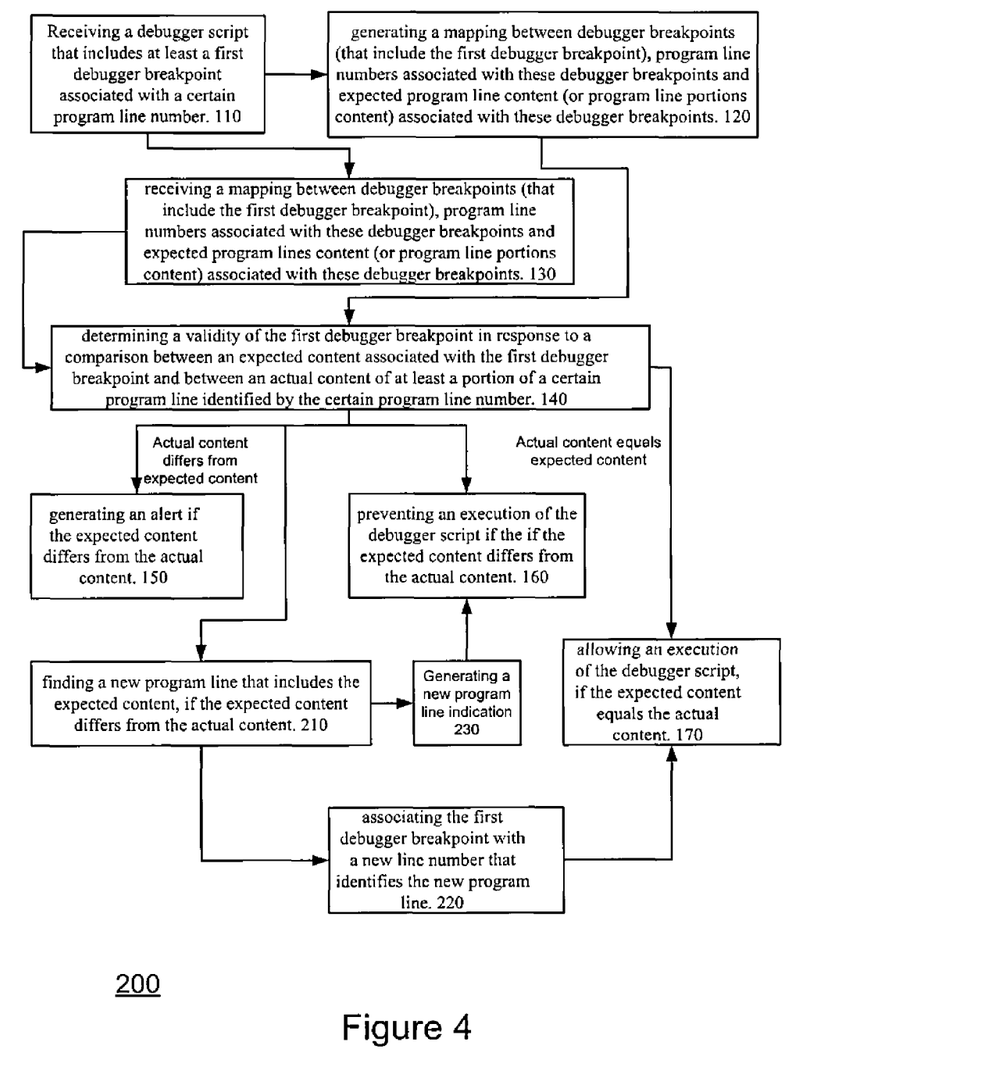
FIG. 4 is a flow chart of a method for evaluating a debugger script, according to another embodiment of the invention.

FIG. 4 is a flow chart of method 200 for evaluating a debugger script, according to an embodiment of the invention.

Method 200 differs from method 100 of FIG. 3 by including stage 210 of finding a new program line that includes at least a portion of the expected content, if the expected content differs from the actual content. Stage 210 can follow stage 140 if the expected content differs from the actual content.

Stage 210 can be followed by stage 220 or stage 230.

Stage 220 includes associating the first debugger breakpoint with a new line number that identifies the new program line. Stage 220 virtually includes modifying the debugger script. Stage 220 can be followed by stage 170 of allowing an execution of the modified debugger script.

Stage 230 includes generating a new program line indication that indicates the new location of the expected content. Stage 230 can be followed by stage 160.

Conveniently, stage 210 includes searching a vicinity of the certain program line in order to find the expected content. Stage 210 can include applying a search technique such as but not limited to: longest substring search, parse based search and imperfect matching.

Figure 5:
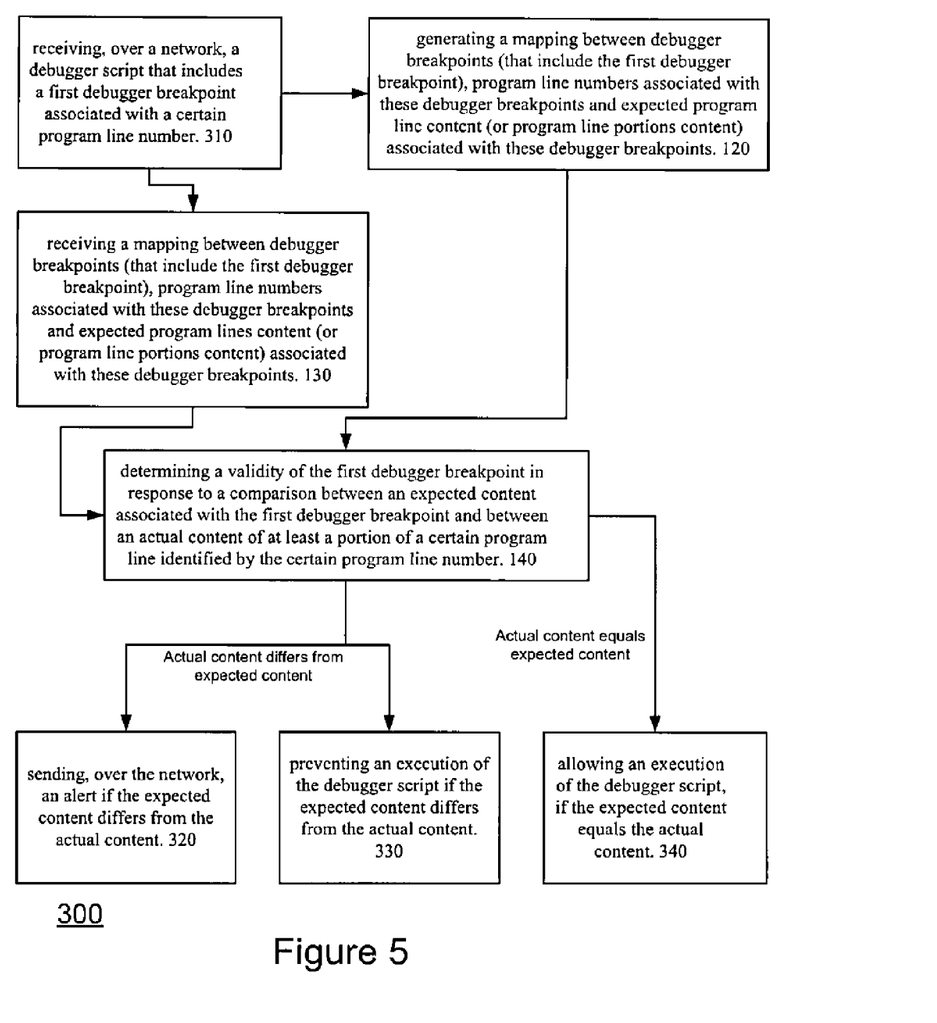
FIG. 5 is a flow chart of a method for providing a service to a customer, over a network, according to another embodiment of the invention.

FIG. 5 is a flow chart of method 300 for providing a service to a customer, over a network, according to another embodiment of the invention.

Method 300 differs from method 100 of FIG. 3 by including stages 310, 320, 330 and 340 instead of stages 110, 150, 160 and 170.

Method 300 starts by stage 310 of receiving, over a network, a debugger script that includes a first debugger breakpoint associated with a certain program line number. Referring to the example set forth in FIG. 2, second device 16 can receive over network 14, debugger script 50 and certain program 46.

Stage 310 can be followed stage 120 or stage 130.

Stage 120 includes generating a mapping between debugger breakpoints (that include the first debugger breakpoint), program line numbers associated with these debugger breakpoints and expected program line group content (or program line group portion content) associated with these debugger breakpoints.

Stage 130 includes receiving a mapping between debugger breakpoints (that include the first debugger breakpoint), program line numbers associated with these debugger breakpoints and expected program line group content (or program line group portion content) associated with these debugger breakpoints.

Stages 120 and 130 are followed by stage 140 of determining a validity of the first debugger breakpoint in response to a comparison between a content associated with the first debugger breakpoint and between a content of at least a portion of a program line group that includes a certain program line identified by the certain program line number.

Stage 140 can be followed by stage 320, stage 330 or stage 340.

Stage 320 includes sending, over the network, an alert if the expected content differs from the actual content. Referring to the example set forth in FIG. 2, second device 16 can send to first device 12, over network 14, an alert.

Stage 330 includes preventing an execution of the debugger script if the if the expected content differs from the actual content. Stage 330 can include sending a debugger prevention indication over the network such as to prevent the execution of the debugger.

Stage 340 includes allowing an execution of the debugger script, if the expected content equals the actual content. Stage 340 may include sending over a network a breakpoint validity indication.

Figure 6:
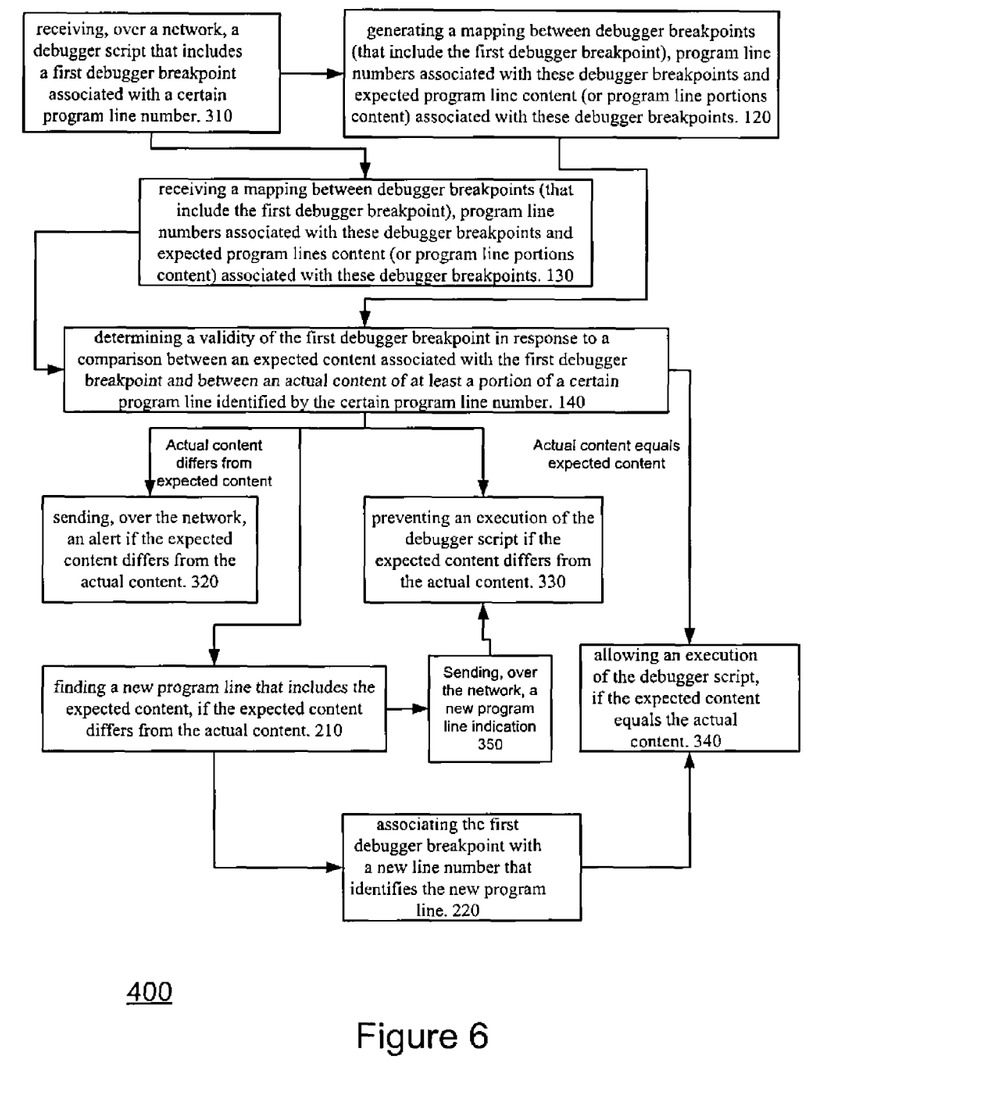
FIG. 6 is a flow chart of a method for providing a service to a customer, over a network, according to another embodiment of the invention.

FIG. 6 is a flow chart of method 400 for providing a service to a customer, over a network, according to another embodiment of the invention.

Method 400 differs from method 300 of FIG. 5 by including stages 210, 220 and 350.

Stage 210 can follow stage 140. Stages 350 and 220 can follow stage 210. Stage 220 is followed by stage 340 while stage 350 is followed by stage 330.

Stage 350 includes sending, over the network, a new program line indication that can include the new line program number.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium including a computer readable program, wherein the computer readable program when executed on a computer causes the computer to: receive a debugger script that comprises a first debugger breakpoint associated with a certain program line number; and determine a validity of the first debugger breakpoint in response to a comparison between a content associated with the first debugger breakpoint and between a content of at least a portion of a certain program line identified by certain program line number.

Conveniently, the computer readable program when executed on a computer causes the computer to find a new program line that includes at least a portion of the content associated with the first debugger breakpoint, if the content associated with the first debugger breakpoint differs from the content of at least a portion of the certain program line.

Conveniently, the computer readable program when executed on a computer causes the computer to associate the first debugger breakpoint with a line number of the new program line.

Conveniently, the computer readable program when executed on a computer causes the computer to apply a search technique selected from a group consisting of: longest substring search, parse based search and imperfect matching.

Conveniently, the computer readable program when executed on a computer causes the computer to periodically repeat the determining of the validity of the first debugger breakpoint.

Conveniently, the computer readable program when executed on a computer causes the computer to receive an indication that a program that comprises the certain program line was modified and in response to determine the validity of the first debugger breakpoint.

Conveniently, the computer readable program when executed on a computer causes the computer to access a mapping data structure that maps debugger breakpoints to program lines numbers and program line contents.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A computer program product comprising a computer usable medium including a non-transitory computer readable program, wherein the computer readable program when executed on a computer causes the computer to:
    receive a debugger script that comprises a first debugger breakpoint associated with a certain program line number;
    determine a validity of the first debugger breakpoint in response to a comparison between an expected content associated with the first debugger breakpoint and between an actual content of at least a portion of a certain program line group that comprises a certain program line identified by the certain program line number; and
    find a new program line that comprises at least a portion of the expected content, if the expected content differs from the actual content and to generate an indication, comprising applying a search technique selected from a group consisting of: longest substring search, parse based search and imperfect matching.

2. The computer program product according to claim 1, wherein the computer readable program when executed on the computer causes the computer to associate the first debugger breakpoint with a line number of the new program line.

3. The computer program product according to claim 1, wherein the computer readable program when executed on the computer causes the computer to periodically repeat the determining of the validity of the first debugger breakpoint.

4. The computer program product according to claim 1, wherein the computer readable program when executed on the computer causes the computer to receive an indication that a program that comprises the certain program line was modified and in response to determine the validity of the first debugger breakpoint.

5. The computer program product according to claim 1, wherein the computer readable program when executed on the computer causes the computer to access a mapping data structure that maps debugger breakpoints to program lines numbers and program line contents.

* * * * *